Figure 1:
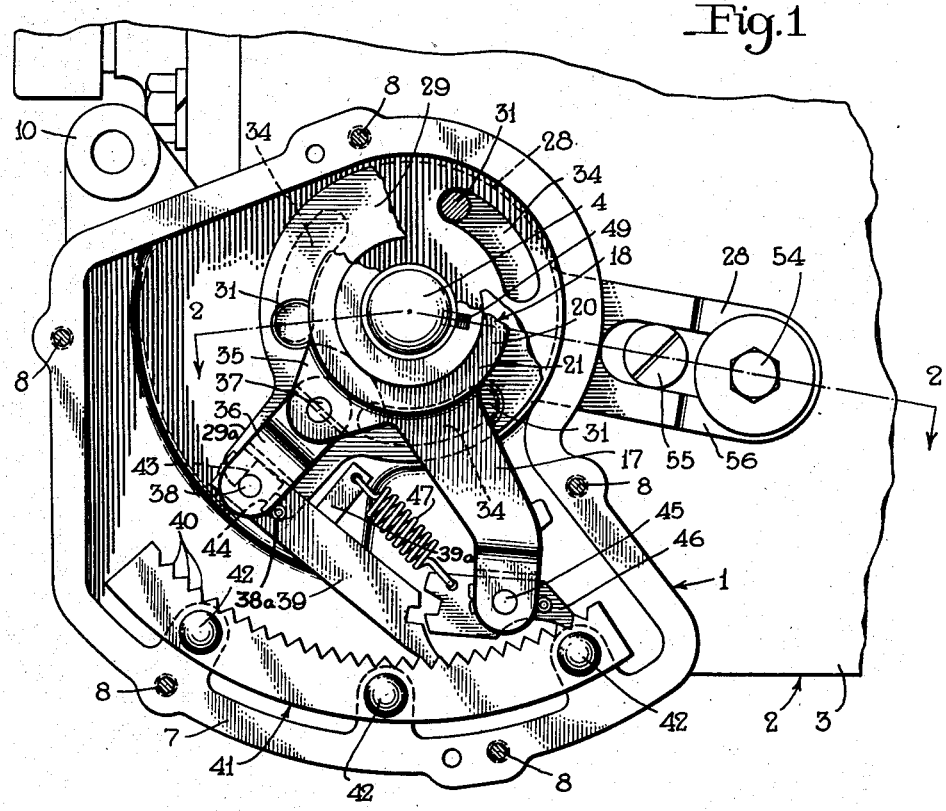

April 25, 1950      J. F. FROLA      2,505,238
BRAKE SLACK ADJUSTING APPARATUS

Filed July 12, 1946      2 Sheets-Sheet 1

INVENTOR
Joseph F. Frola
BY
ATTORNEY

April 25, 1950     J. F. FROLA     2,505,238
BRAKE SLACK ADJUSTING APPARATUS

Filed July 12, 1946     2 Sheets-Sheet 2

INVENTOR
Joseph F. Frola
BY
ATTORNEY

Patented Apr. 25, 1950

2,505,238

UNITED STATES PATENT OFFICE 2,505,238

BRAKE SLACK ADJUSTING APPARATUS

Joseph F. Frola, Braddock, Pa., assignor to The Westinghouse Air Brake Company, Wilmerding, Pa., a corporation of Pennsylvania Application July 12, 1946, Serial No. 683,288

8 Claims. (Cl. 188—196)

This invention relates to automatic slack adjusting apparatus for brakes and more particularly to that type of combined brake lever and slack adjuster or take-up mechanism for vehicle brake rigging shown and described in the copending application of Cecil S. Kelley, Serial No. 634,493 filed December 12, 1945, for slack adjuster, now Patent No. 2,429,693, issued October 28, 1947.

An object of the invention is to provide an improved combined brake lever and slack take-up mechanism of the above mentioned type which will function as a brake lever so long as there is no undue slack in the brake rigging, and which will function to take up slack as wear of the brake shoes or brake lining occurs.

A well known type of brake employed on vehicles comprises a brake drum having an internal braking surface, brake shoes or a brake band adapted to engage the braking surface of the drum and a cam adapted upon rotation to expand the brake shoes or brake band so as to frictionally engage the braking surface of the drum.

In this type of brake, as the brake shoes or brake band wear away, a further rotative movement of the cam is required in order to secure braking action. The combined brake lever and slack take-up mechanism constituting the present invention is designed to first actuate a pull rod which in turn actuates a lever to rotate the cam to effect the desired braking. If, due to wear of the brake shoes or brake band, the above mentioned further rotative movement of the cam is required, the combined brake lever and slack adjuster will compensate for such movement adjusting the cam so that the required clearance space between the friction braking surface of the drum and the brake shoes or brake band is maintained regardless of the amount of wear of the brake shoes or brake band.

Another object of the invention is to provide a combined brake lever and slack take-up mechanism in which the brake lever portion is in the form of a hollow casing and in which the operating parts of the slack take-up mechanism are located within the casing where they will be protected against damage and where dirt, snow and ice will not be permitted to collect thereon.

In some types of vehicle brake rigging there is included an actuator having a casing which is rigidly secured to a part of the vehicle and which contains a mechanism controllable to rock an operating shaft to actuate a brake lever secured to the shaft for controlling the operation of a brake rigging to apply and release the vehicle brake. The brake lever is located exteriorly of the casing of the actuator and is secured to the operating shaft for operation thereby.

Another object of the invention is to provide a combined brake lever and slack take-up mechanism which may be substituted for the brake lever heretofore employed with an actuator of the above mentioned type without having to change the actuating mechanism located within the actuator casing, thus rendering it a simple matter to incorporate the automatic slack take-up feature in a brake rigging not initially embodying such a feature.

A further object of the invention is to provide a combined brake lever and slack take-up mechanism in which the several parts thereof when assembled may be placed on the operating shaft of an actuator as a unitary structure.

Other objects and advantages will appear in the following more detailed description of the invention.

Figure 2:
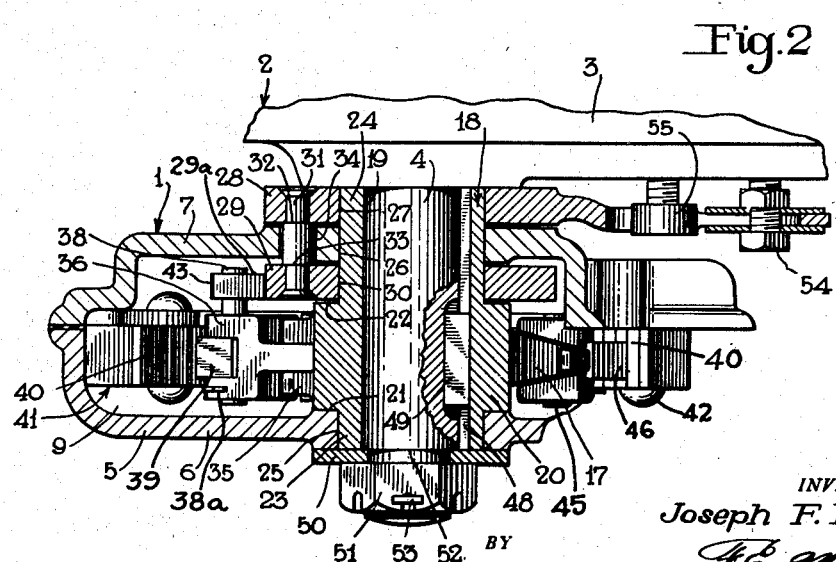
Figure 3:
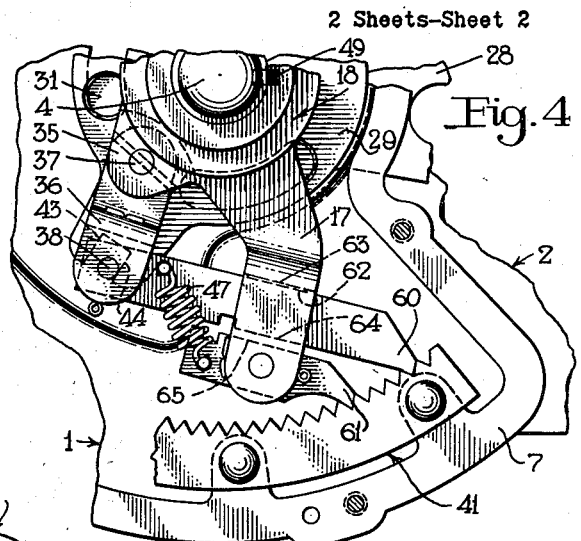
Figure 4:
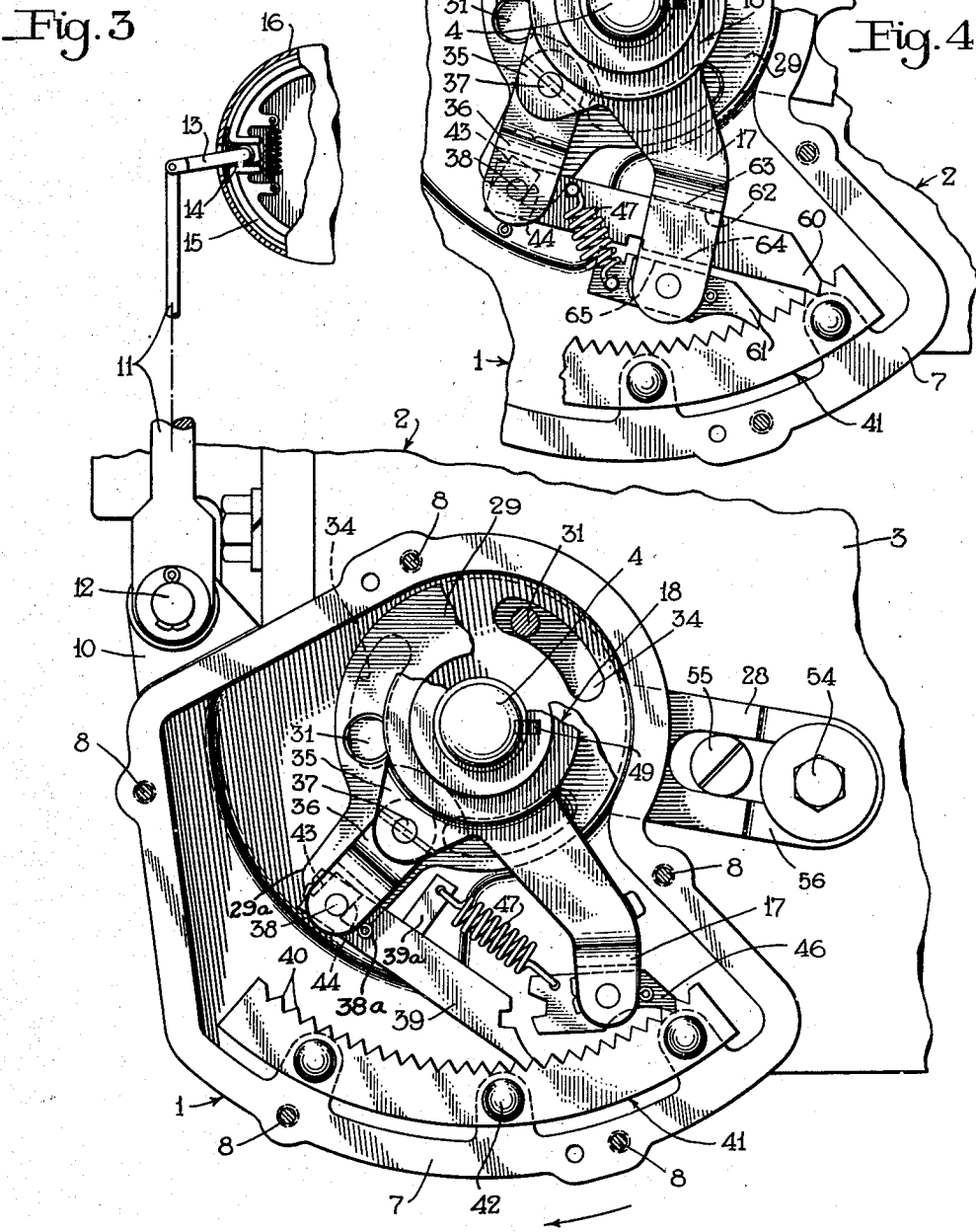

In the accompanying drawings, Fig. 1 is a bottom plan view of the combined brake lever and slack take-up mechanism, portions of the lever being removed to more clearly illustrate the invention. In this view the combined lever and slack take-up mechanism is shown applied to the operating shaft of a brake actuator, the lever and other parts of the mechanism being shown in the position they assume with the brake released. Fig. 2 is a vertical sectional view taken on the line 2—2 of Fig. 1; Fig. 3 is a view similar to Fig. 1 but illustrating the slack take-up operation of the mechanism; and Fig. 4 is a fragmentary view similar to Fig. 3 of a modified form of the invention but illustrating the several parts in position to take up slack which may develop.

For illustrative purposes the combined brake lever and slack take-up mechanism 1 is shown applied to an actuator 2. This actuator comprises a casing 3, a brake controlling shaft 4 which is suitably journaled in the casing and which extends to the exterior thereof as best shown in Fig. 2, the combined brake lever and slack take-up mechanism being arranged exterior of the casing and being mounted on the shaft for operation thereby.

This actuator 2 may be of the type in which a spring is employed to drive the shaft 4 in the brake applying direction and in which an electrically controlled solenoid is employed to maintain the shaft in its brake release position so long as the solenoid is maintained energized, the energization and deenergization of the solenoid being under the control of the operator of the vehicle.

The combined brake lever and slack take-up mechanism 1 comprises a hollow lever portion 5 which is made of two oppositely recessed casing sections 6 and 7 rigidly secured together by set screws 8 or other suitable means to form a chamber 9.

The casing section 7 is provided with an exterior lug 10 to which, as shown in Fig. 3, one end of the pull rod 11 of a brake rigging may be operatively attached by means of a pin 12, the opposite end of the rod being operatively attached to a lever 13 which is adapted to rock a cam 14 to cause the internal expanding brake shoes or band 15 of a drum brake to frictionally engage the braking surface of the brake dum 16.

Contained in the chamber 9 is a brake actuating arm 17 which is integrally or otherwise rigidly attached to rockable actuating sleeve 18 having an axially disposed opening 19 extending therethrough. Between its ends this sleeve member is provided with a portion 20 which is of greater diameter than the other portions of the member so as to provide annular shoulders 21 and 22, the shoulder 21 being located at one side of the arm 17 and the shoulder 22 being located at the other side of the arm.

At one side of the shoulder 21 the casing section 6 is rockably journaled on the end portion 23 of the sleeve member while the casing section 7 is rockably journaled at one side of the shoulder 22, on the end portion 24 of the sleeve member.

The portion 23 of the sleeve member extends through an opening 25 provided in the casing section 6 while the portion 24 of the member extends through an opening 26 provided in the casing section 7 and in axial alignment with the opening 25. This portion 24 of the sleeve member extends to the exterior of the casing section 7 and extends through an opening 27 in a member 28 which, as will hereinafter more fully appear, is rigidly secured to the casing of the actuator 2.

Contained in the chamber 9 and located between the shoulder 22 and the wall of the casing section 7 is an annular member 29 having an opening 30 formed therein through which the portion 24 of the sleeve member extends. This member 29 is rigidly secured to the member 28 by means of three circumferentially spaced rivets 31 having countersunk heads at opposite ends, each rivet having intermediate its ends a portion of enlarged diameter to provide shoulders 32 and 33 which respectively engage with the opposing faces of the members 28 and 29 to maintain the members spaced apart a predetermined distance. It should here be mentioned that the sleeve member 18 is freely rockable relative to the members 28 and 29.

The rivets 31 extend through arcuate slots 34 provided in the casing section 7, which slots are of such width and length as to permit the lever when it is properly attached to the actuator to rock freely at all times, relative to the members 28 and 29 as will hereafter be more fully described.

The sleeve member 18 is provided with a short lug 35 to which the inner end of a link 36 is pivotally attached by means of a pin 37. The outer end of this link is bifurcated and disposed therein and pivotally attached thereto by means of a pin 38 is one end of a locking pawl 39, the other end of the pawl being adapted to engage a tooth 40 of an arcuate toothed rack 41 contained in the chamber 9 and rigidly secured to the casing section 7 by means of rivets 42. A cotter pin 38a extends through the link 36 and pin 38 holding the pin in place.

The pin 38 extends from one side of link 36 through a slot provided in the end of an arm 29a projecting from the stationary member 29, the opposite sides 43, 44 of said slot constituting two spaced measuring stops arranged for engagement by pin 38 to limit travel of said pin relative to said member when a brake application is effected or released.

Pivotally mounted on the outer end of the brake actuating arm 17 by means of a pin 45 is a driving pawl 46 which is adapted to engage a tooth 40 of the rack 41. This pawl and the pawl 39 are maintained in engagement with the rack 41 by the action of a coil tension spring 47 which has one of its ends attached to the pawl 46 and the other of its ends attached to the pawl 39 by means of a pawl extension 39a.

It will be understood that in assembling the combined brake lever and slack take-up mechanism the members 28 and 29 will be riveted together and thereby associated with the casing section 7 before this casing section and the casing section 6 are secured together. With the other parts of the lever and slack take-up mechanism mounted in the casing section, the casing sections are then secured together by means of the screws 8. The several parts of the lever and slack take-up mechanism being thus secured together as a unit they cannot come apart since the shoulder 21 of the sleeve member is adapted to engage with the casing section 6 and the shoulder 22 is adapted to engage with member 29. It will be understood that the only relative movement between the sleeve member and the casing section in directions longitudinally of the sleeve member will be limited to that which the necessary commercial clearances will permit.

Interiorly the sleeve member is provided, throughout its length, with a slot 48 which is open to the opening 19 for the accommodation of a driving key 49 which is carried by the actuator shaft 4.

From the foregoing description it will be seen that the combined brake lever and slack take-up mechanism may be assembled and associated with the actuator 2 as a unit.

Assuming that the combined brake lever and slack take-up mechanism has been assembled as hereinbefore described and it is desired to apply it to an actuator 2, the driving key 49 will be placed in a suitable recess or slot in the actuating shaft 4 of the actuator. The unitary combined brake lever and slack take-up mechanism will now be slid over the end portion of the shaft 4 to the position in which it is shown, the slot 48 in the sleeve member accommodating the key 49. When the unit is thus positioned on the shaft 4 a washer 50 is slipped over the end of the shaft and a nut 51 having screw threaded connection with the end of the shaft is tightened against the washer thus holding the washer against a shoulder 52 provided on the shaft as best shown in Fig. 2.

With the washer held tightly against the shoulder 52 by the nut 51 and the nut locked against turning by a lock pin 53, the washer will form a thrust bearing for the outer end of the sleeve member and the casing section 6 and will hold the sleeve member in such a position that the inner end thereof may slidably contact the casing 3 of the actuator 2.

The final step in mounting the unit consists in securing the member 28 to the casing 2 of the actuator against rotation. This is accomplished by first placing the member in the position in which it is shown in Fig. 1, and then securing it by means of a bolt 54 and a screw 55 which have screw-threaded connection with the actuator casing 3 and which engage an extension 56 of the member. The bolt 54 secures the member against movement in directions longitudinally of the sleeve member and the screw 55 serves as a stop to prevent rotation of the member. Since the rivets secure the members 28 and 29 rigidly together the member 29 will be held stationary against rotary movement and movement in directions longitudinally of the actuating shaft 4 of the actuator 2.

While the present invention has been shown in connection with a spring applied electrically released brake actuator it is not limited to this use for it will be apparent that the shaft 4 may be actuated by means other than the brake applying spring and the electric brake releasing means of the actuator.

Operation

Assuming that the several parts of the combined brake lever and slack take-up mechanism are mounted on the actuator shaft 4 and the member 29 is secured against movement relative to the casing 3 of the actuator, and assuming further that the several parts of the mechanism are in their brake release position, as shown in Fig. 1, and it is desired to effect an application of the brakes, the operator, by the use of a suitable control device, causes the shaft 4 of the actuator and arm 17 of the combined brake lever and slack take-up mechanism to be rocked in the direction indicated by the arrow in Fig. 1. Since the driving pawl 46, which is pivotally connected to the arm 17, is held by spring 47 in driving engagement with a tooth 40 of the rack 41, the rack and connected casing sections 6 and 7 will be rocked in the same direction.

The toothed rack 41, as it is thus being rocked, will drag the locking pawl 39 with it, and this pawl will move the measuring pin 38 out of engagement with the stationary measuring stop 43 into engagement with the stationary measuring stop 44, the spring 47 acting to prevent the pawl from ratcheting out of engagement with the tooth it is shown engaging in Fig. 1.

It will here be understood from an inspection of Fig. 3 that when the connected casing sections 6 and 7 are rocked as above described they will act, through the medium of the lug 10 on the section 7, to operate the pull rod 11 and thereby the lever 13 and cam 14 to expand the brake shoes or brake band 15 into frictional braking engagement with the internal braking surface of the brake drum 16.

If, when the measuring pin 38 is in engagement with the stationary measuring stop 44, wear of the brake shoes or lining or any other slack producing condition becomes such that the toothed rack 41 and thereby the connected casing sections 6, 7 move in the direction indicated by the arrow in Fig. 1 relative to the stationary measuring stop 44, one or more teeth will pass under the locking end of the pawl 39, which pawl is at this time held against movement with the toothed rack by the engagement of the locking pin with the stop 44. As shown in Fig. 3 the locking pawl will, due to the action of the spring 47 engage a tooth 40 to the left of the tooth which was formerly engaged.

Now when the actuator shaft 4 and arm 17 are rocked in the direction indicated by the arrow in Fig. 3, i. e., in the brake releasing direction, the driving pawl 46 will ratchet back over one or more of the teeth 40, depending upon the distance the connected casing sections 6 and 7 have been previously moved relative to the locking pawl 39, until such time as the ratcheting action is brought to a stop by the left hand end of the driving pawl 46 engaging the locking pawl 39. While the movement of the driving pawl relative to the connected casing sections and locking pawl has been stopped by such engagement the driving pawl will act through the medium of the locking pawl to drive the locking pawl and casing sections in the brake releasing direction until such time as the pin 38 engages the stationary measuring stop 43 and brings the locking pawl and thereby the connected casing sections, driving pawl, arm 17 and shaft 4 to a stop in brake released position. It should here be mentioned that the movement of the pin out of engagement with the stop 44 across the space between the stops 44 and 43 and into engagement with the stop 43 serves to provide the proper release clearance between the brake shoes or brake band and the brake drum, and also insures that this clearance will always be the same after each application of the brakes regardless of the amount of wear of the brake shoes or brake band during an application of the brakes.

The combined brake lever and slack take-up mechanism operate to effect the release of the brake in the manner just described when there is no other spring employed to supplement the usual light release spring in the brake drum, but when a release spring is employed which is capable of moving the casing sections 6 and 7 to their release position when the shaft 4 is rocked in the brake releasing direction a slightly different operation of the several parts of the combined brake lever and slack take-up mechanism may occur as will now be described.

Assuming that a heavy release spring is employed in the brake rigging and the brake actuator shaft 4 is caused to rock in the brake releasing direction, the arm 17, driving pawl 46 and locking pawl, due to the pull of the heavy release spring, will not be caused to immediately change their positions relative to each other but will rock in unison until such time as the pin 38 engages the measuring stop 43 and brings the locking pawl 39 and thereby the connected casing sections 6 and 7 to a stop. If during the application of the brake wear of the brake shoes or brake band has occurred, the continued release movement of the brake actuator shaft 4 and consequently of the arm 4 will cause the driving pawl to ratchet over one or more of the teeth 40 of the rack 41 until such time as the left-hand end of the driving pawl 46 abuts the locking pawl 39 and brings the driving pawl to a stop in an advanced driving position with relation to the toothed rack. It should here be mentioned that the same adjustment of the brake is attained by this release operation as is attained when the driving pawl 46 acts through the medium of the locking pawl 39 to drive the casing sections 6 and 7 to brake release position.

It will be understood that when the pawls 39 and 46 are repositioned as just described, the left-hand end of the pawl 46 will serve to positively lock the locking pawl 39 in locking engagement with toothed rack 41 until such time as wear again occurs.

Description of the modification shown in Fig. 4.

This modified form of the invention differs from the form shown in Figs. 1 to 3, inclusive, in that the locking pawl 60, which corresponds with locking pawl 39, extends over and beyond the driving pawl 61, which corresponds with the driving pawl 46, into driving engagement with the toothed rack 41 carried by the part 6 of the brake lever. It will here be noted that the locking pawl extends through the jaw formed in the driving arm 17 for the accommodation of the driving pawl 61. As shown, an edge surface 62 of the locking pawl is adapted to be engaged by the adjacent surface 63 of the arm 17. The opposite edge surface 64 of the locking pawl is adapted to be engaged by an adjacent edge surface 65 of the driving pawl 61.

In function this form of the invention differs from that of the form shown in Figs. 1 to 3, inclusive, in that slack that may develop is taken up a tooth at a time, that is to say, the maximum amount of slack that can be taken up during any single application and release cycle of the mechanism will equal the distance between two teeth of the rack 41, as will be apparent from the following description.

In operation, assuming that an application of the brakes is being effected and the pin 38 is in engagement with the stationary stop 44, as shown, and that slack is being developed, the driving pawl will be moved by the arm travelling in a counterclockwise direction, toward the locking pawl 60 and at the same time the surface 63 of the arm 17 will move away from the edge surface 62 of the locking pawl. As the driving pawl is driving the brake lever in this counterclockwise direction, the locking pawl can ride freely over a tooth of the toothed rack 41, the surface 63 having by this time been moved a sufficient distance away from the surface 62 of the locking pawl to permit the pawl to clear the tooth.

It should here be mentioned that if the brake lever should be driven from the position in which it is shown in the counterclockwise direction a distance greater than the distance between two adjacent teeth of the rack 41 the edge surface 65 of the driving pawl will engage the surface 64 of the locking pawl and hold the locking pawl out of engagement with the rack 41.

Now when the arm 7 is rocked in a clockwise direction to release the brake, the driving pawl and brake lever will move in unison in the same direction. The driving pawl as it thus moves permits the locking pawl to move into engagement with the tooth of the rack 41 located at the left of the tooth that the pawl is shown engaging. With the locking pawl in this position the driving pawl will ratchet over one tooth of the rack 41 into engagement with the tooth located at the left of the tooth that the pawl is shown engaging. Thus it will be seen that regardless of how far the brake lever is rocked in the brake applying or counterclockwise direction beyond the position in which it is shown in the drawing, the locking pawl and driving pawl will be advanced only one tooth.

When the driving pawl has moved to its new position the surface 63 of the arm 17 contacts the edge surface 62 of the locking pawl, so that the arm may now act through the medium of the locking pawl to drive the brake lever to its normal brake release position in which the stop 43 acts to stop the pawl and thereby the brake lever and arm 17 in their normal brake released position against further movement in the clockwise direction.

Aside from the differences above noted, the details of this form of the invention may be identical with those of the form shown in Figs. 1 to 3, inclusive.

It will be apparent that after each adjusting action, of either form of the invention, the space between the friction braking surfaces of the brake drum and the brake shoes or brake band will be substantially the same as that originally provided, thus eliminating excessive rocking movement of the actuator shaft in effecting either an application or a release of the brakes.

Having now described my invention, what I claim as new and desire to secure by Letters Patent, is:

1. In a combined brake lever and slack take-up mechanism for mounting on a brake actuator having a stationary part and a brake controlling shaft rockably mounted in the stationary part, a hollow brake lever rockable in one direction to actuate brake apparatus to brake applied position and rockable in the opposite direction to actuate the brake apparatus to brake released position, a toothed rack disposed interiorly of and rigidly carried by said hollow brake lever, a locking member disposed interiorly of said hollow brake lever and cooperating with a tooth of said rack to hold the lever against movement relative thereto in said opposite direction but being ineffective to hold the lever against movement relative thereto in said one direction, said locking member being movable in unison with the brake lever in both directions, a member disposed exteriorly of the brake lever and being adapted to be rigidly secured to the stationary part of the brake actuator, stop means located interiorly of said hollow brake lever and rigidly attached to said member, said stop means being arranged to cooperate with said locking member to limit the movement of the member in unison with the brake lever in both directions, a rockable driving arm located interiorly of the hollow brake lever and adapted to be secured to the brake controlling shaft of the brake actuator for rocking movement therewith, one-way driving means cooperating with said arm and a tooth of said rack for driving the lever in said one direction, said lever when rocked in said one direction relative to said locking member being locked by the locking member in an advanced position against movement in said opposite direction relative to the locking member, and said one-way driving means being operative by said arm relative to said brake lever to an advanced driving position upon the subsequent movement of said arm in said opposite direction.

2. In a combined brake lever and slack take-up mechanism for attachment to a brake actuator having a stationary part and a brake controlling shaft rockably mounted in said stationary part, a sleeve member for attachment to said brake controlling shaft for rocking movement therewith, a hollow brake lever rockably mounted on said sleeve member and having means for attachment to a brake part to be actuated, driving means cooperating with said sleeve member and brake lever for transmitting rocking movement from the sleeve member to the brake lever in the brake applying direction, a member disposed exteriorly of said brake lever for rigid attachment to the stationary part of the brake actuator, a pair of spaced stops located interiorly of said brake lever and rigidly attached to said member, and locking means cooperating with one of said stops and said brake lever for locking the lever in its brake release position against further movement in the brake releasing direction and being movable into stopped relationship with the other of said stops by the lever as the lever is being moved from its brake release position in the brake applying direction, said locking means functioning to assume an advanced locking position with relation to the brake lever in response to movement of the lever in the brake applying direction after the locking means has been stopped by said other stop, and said driving means being subsequently movable relative to said brake lever in the brake releasing direction into stopped relationship with said locking means to an advanced driving position with relation to the brake lever.

3. In a combined brake lever and slack take-up mechanism for attachment to a brake actuator having a stationary part and a brake controlling shaft rockably mounted in said stationary part, a sleeve member for attachment to said brake controlling shaft for rocking movement therewith, a hollow brake lever rockably mounted on said sleeve member and having means for attachment to a brake part to be actuated, a member disposed exteriorly of said brake lever for rigid attachment to the stationary part of said brake actuator, measuring means disposed interiorly of said brake lever rigidly secured to said member, driving means disposed interiorly of said brake lever and operative to transmit rocking movement from said sleeve member to the lever in the brake applying direction and to move relative to the lever in the brake releasing direction, locking means disposed interiorly of the lever and cooperating with said measuring means and said brake lever to limit movement of the lever in the brake releasing direction and to permit movement of the lever relative thereto in the brake applying direction as slack develops, said driving means, locking means and measuring means cooperating upon the rocking of the sleeve member in the brake applying direction and the subsequent rocking of the sleeve member in the brake releasing direction to adjust the position of the brake lever to take up any slack which may have developed.

4. In a combined brake lever and slack take-up mechanism for attachment to a brake actuator having a stationary part and a brake controlling shaft rockably mounted in said stationary part, a sleeve member for attachment to said brake controlling shaft for rocking movement therewith, a hollow brake lever rockably mounted on said sleeve member and having means for attachment to a brake part to be actuated, ratchet driving means disposed interiorly of said brake lever operative in one direction for transmitting rocking movement from said sleeve member to the lever and operative in the opposite direction relative to the lever, ratchet locking means disposed interiorly of said brake lever and cooperating therewith to limit the movement thereof in said opposite direction but being ineffective to limit movement of the brake lever in said one direction, said locking means being movable a limited distance with the lever as the lever moves in said opposite direction, a member disposed exteriorly of said brake lever for rigid attachment to the stationary part of the brake actuator, stop means rigidly attached to said member and disposed interiorly of said brake lever arranged to cooperate with said locking means to limit the movement of the brake lever in both directions, said locking means being arranged to assume an advanced locking position with relation to said brake lever in response to movement of the brake lever in said one direction after the locking means has reached the limit of its movement in this direction and said driving means being arranged to assume an advanced driving position with relation to said brake lever when said sleeve member is rocked in said opposite direction.

5. In a combined brake lever and slack take-up mechanism for attachment to a brake actuator having a stationary part and a brake controlling shaft rockably mounted in said stationary part, a sleeve member for attachment to said brake controlling shaft for rocking movement therewith, a hollow brake lever rockably mounted on said sleeve member and having means for attachment to a brake part to be actuated, ratchet driving means disposed interiorly of said brake lever operative in one direction for transmitting rocking movement from said sleeve member to the lever and operative in the opposite direction relative to the lever, ratchet locking means disposed interiorly of said brake lever and cooperating therewith to limit the movement thereof in said opposite direction but being ineffective to limit movement of the brake lever in said one direction, said locking means being movable a limited distance with the lever as the lever moves in said opposite direction, a member disposed exteriorly of said brake lever for rigid attachment to the stationary part of the brake actuator, stop means rigidly attached to said member and disposed interiorly of said brake lever arranged to cooperate with said locking means to limit the movement of the brake lever in both directions, said locking means being arranged to assume an advanced locking position with relation to said brake lever in response to movement of the brake lever in said one direction after the locking means has reached the limit of its movement in this direction and said driving means being arranged to assume an advanced driving position with relation to said brake lever when said sleeve member is rocked in said opposite direction, said brake lever, sleeve member and stop means cooperating with each other to form a unitary structure for attachment to the brake actuator.

6. In a combined brake lever and slack take-up mechanism for attachment to a brake actuator having a stationary part and a brake controlling shaft rockably mounted in said stationary part, a sleeve member for attachment to said brake controlling shaft for rotation therewith in the brake applying direction and also in the brake releasing direction, a hollow brake lever rockably mounted on said sleeve member, means disposed interiorly of said brake lever for transmitting rocking movement from said sleeve to the lever, slack take-up means disposed interiorly of said brake lever and cooperating therewith to take up slack, measuring means disposed interiorly of said brake lever for cooperation with said slack take-up means to measure the amount of slack to be taken up, and a member disposed exteriorly of said brake lever for rigid attachment to the stationary part of said brake actuator, and means rigidly securing said member and measuring means together.

7. In a combined brake lever and slack take-up mechanism for attachment to a brake actuator having a stationary part and a brake controlling shaft rockably mounted in said stationary part, a sleeve member for attachment to said brake controlling shaft for rotation therewith in the brake applying direction and also in the brake releasing direction, a hollow brake lever rockably mounted on said sleeve member, means disposed interiorly of said brake lever for transmitting rocking movement from said sleeve to the lever, slack take-up means disposed interiorly of said brake lever and cooperating therewith to take up slack, measuring means disposed interiorly of said brake lever for cooperation with said slack take-up means to measure the amount of slack to be taken up, a member disposed exteriorly of said brake lever for rigid attachment to the stationary part of said brake actuator, and means rigidly securing said member and measuring means together, said brake lever, sleeve member and measuring means cooperating to form an assembled structure which may be applied to said brake actuator as a unit.

8. In a combined brake lever and slack take-up mechanism for attachment to a brake actuator having a stationary part and a brake controlling shaft rockably mounted in said stationary part, a sleeve member for attachment to said brake controlling shaft for rotation therewith in the brake applying direction and also in the brake releasing direction, a hollow brake lever rockably mounted on said sleeve member, means disposed interiorly of said brake lever for transmitting rocking movement from said sleeve to the lever, a slack take-up means disposed interiorly of said brake lever and cooperating therewith to take up slack, measuring means disposed interiorly of said brake lever for cooperation with said slack take-up means to measure the amount of slack to be taken up, and a member disposed exteriorly of said brake lever for rigid attachment to the stationary part of said brake actuator, and means rigidly securing said member and measuring means together, said brake lever, sleeve member and measuring means cooperating with each other to maintain the several parts of the combined brake lever and slack take-up mechanism together as a unit for attachment to said brake actuator.

JOSEPH F. FROLA.

REFERENCES CITED

The following references are of record in the file of this patent:

UNITED STATES PATENTS

| Number | Name | Date |
|---|---|---|
| 1,525,568 | Chapin | Feb. 10, 1925 |
| 2,429,693 | Kelley | Oct. 28, 1947 |

FOREIGN PATENTS

| Number | Country | Date |
|---|---|---|
| 424,178 | Great Britain | Feb. 15, 1935 |